(12) United States Patent
Benner et al.

(10) Patent No.: US 11,460,335 B2
(45) Date of Patent: Oct. 4, 2022

(54) FILLING LEVEL INDICATOR

(71) Applicant: CONTINENTAL AUTOMOTIVE GmbH, Munich (DE)

(72) Inventors: Hans Guenter Benner, Kriftel (DE); Bernd Pauer, Eppstein (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 576 days.

(21) Appl. No.: 16/318,992

(22) PCT Filed: Jul. 12, 2017

(86) PCT No.: PCT/EP2017/067477
§ 371 (c)(1),
(2) Date: Jan. 18, 2019

(87) PCT Pub. No.: WO2018/015230
PCT Pub. Date: Jan. 25, 2018

(65) Prior Publication Data
US 2019/0242740 A1  Aug. 8, 2019

(30) Foreign Application Priority Data
Jul. 22, 2016 (DE) .......................... 102016213502.3

(51) Int. Cl.
*G01F 23/32* (2006.01)
*G01F 23/38* (2006.01)
(Continued)

(52) U.S. Cl.
CPC ............. *G01F 23/38* (2013.01); *G01F 23/46* (2013.01); *G01F 23/62* (2013.01)

(58) Field of Classification Search
CPC ................................ G01F 23/32; G01F 23/38
See application file for complete search history.

(56) References Cited

U.S. PATENT DOCUMENTS 5,341,679 A * 8/1994 Walkowski ............. G01F 23/36
73/313
6,070,337 A   6/2000 Wallrafen
(Continued)

FOREIGN PATENT DOCUMENTS

CN    2503595 Y    7/2002
CN    103512637    1/2014
(Continued)

OTHER PUBLICATIONS

Benner, google translated copy of applicant provided DE102005047542, 2005 (Year: 2005).*
(Continued)

*Primary Examiner* — Lisa M Caputo
*Assistant Examiner* — Alex T Devito
(74) *Attorney, Agent, or Firm* — Cozen O'Connor

(57) ABSTRACT

A filling level indicator for determining a filling level in a tank, having a resistor network arranged on a carrier substrate, a contact element, and a magnetic element. The contact element is arranged adjacent to the resistor network and the magnetic element is movable relative to the resistor network and the contact element. The contact element has a contact region deflectable by the magnetic element. An electrically conductive connection between the contact region and the resistor network is produced by the deflection of the contact region. The contact element has an attachment region connected to the carrier substrate, and the contact region is formed spaced apart from the resistor network and the carrier substrate.

8 Claims, 1 Drawing Sheet

(51) Int. Cl.
G01F 23/62 (2006.01)
G01F 23/46 (2006.01)

(56) References Cited

U.S. PATENT DOCUMENTS

| | | | | |
|---|---|---|---|---|
| 6,401,533 B1* | 6/2002 | Gier | ............... | H01H 36/02 |
| | | | | 73/317 |
| 2003/0159507 A1* | 8/2003 | Bergsma | ............... | G01F 23/363 |
| | | | | 73/313 |
| 2010/0199759 A1* | 8/2010 | Prasad | ............... | G01F 23/363 |
| | | | | 73/317 |
| 2010/0207610 A1* | 8/2010 | Benner | ............... | G01D 5/251 |
| | | | | 324/207.13 |

FOREIGN PATENT DOCUMENTS

| | | |
|---|---|---|
| DE | 19701246 | 7/1998 |
| DE | 102004039853 | 3/2006 |
| DE | 102005047542 | 5/2007 |
| DE | 102007061316 | 6/2009 |
| WO | WO2015/185265 | 12/2015 |
| WO | WO2015/185270 | 12/2015 |

OTHER PUBLICATIONS

International Search Report based on PCT/FP2017/067477 dated Sep. 14, 2017.

* cited by examiner

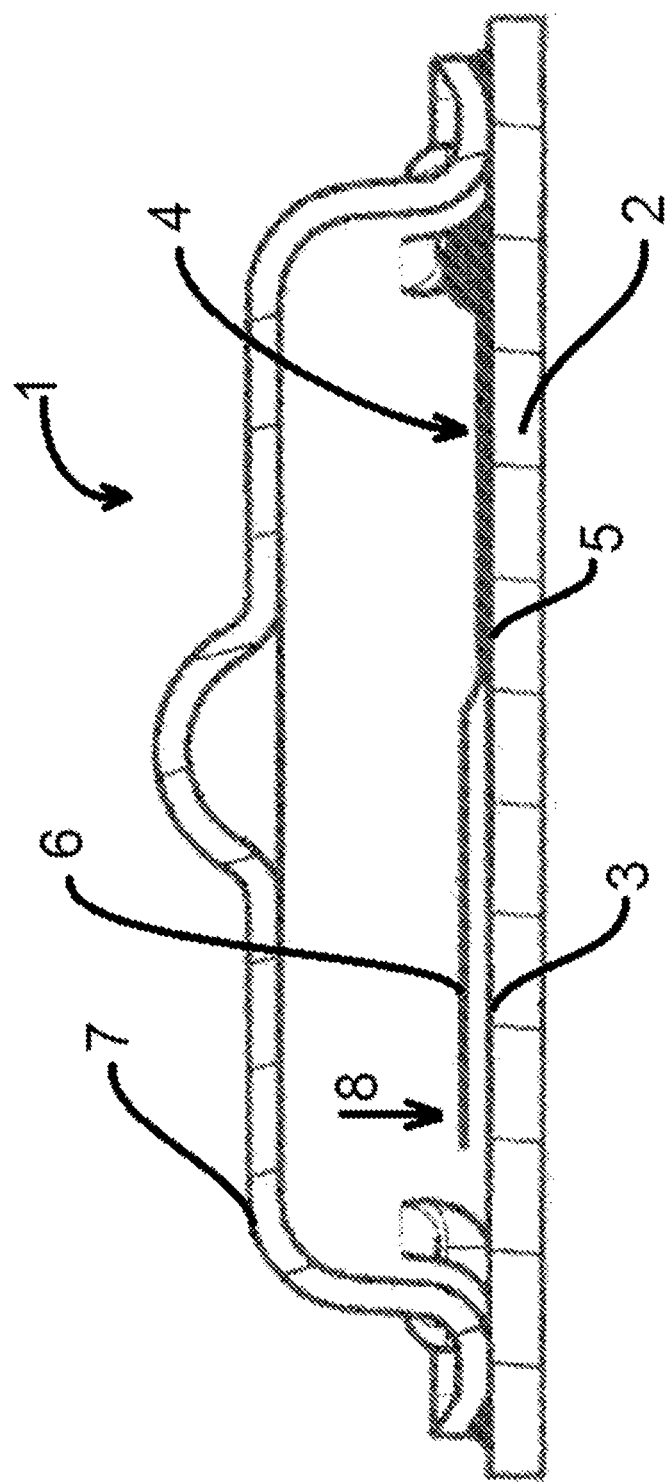

FILLING LEVEL INDICATOR

CROSS-REFERENCE TO RELATED APPLICATIONS

This is a U.S. national stage of application No. PCT/EP2017/067477 filed Jul. 12, 2017.

This application claims the priority of German Application No. 102016213502.3 filed Jul. 22, 2016, the entire content of which is hereby incorporated herein by reference.

BACKGROUND OF THE INVENTION

1. Field of the Invention

The invention relates to a filling level indicator for determining a filling level in a tank, having a resistor network arranged on a carrier substrate, a contact element, and a magnetic element. The contact element is arranged adjacent to the resistor network and the magnetic element is movable relative to the resistor network and the contact element. The contact element has a contact region that can be deflected by the magnetic element, wherein an electrically conductive connection between the contact region and the resistor network can be produced by the deflection of the contact region.

2. Description of the Related Art

Filling level indicators for determining the filling level in a fuel tank have a resistor network that generates a signal as a function of the actual filling level, which signal corresponds to the filling level in the fuel tank. For this purpose, a float is generally provided that floats on surface of the fuel in the fuel tank and acts on the resistor network by a linkage and a sliding contact. The movement of the float owing to a rising or falling filling level is transmitted via the linkage to the sliding contact, which is moved past the resistor network as a result of the movement. Here, a varying signal is generated as a function of the position of the sliding contact. By normalizing the signal and by configuring the resistor network in a specific way, it is possible to infer the filling level in the fuel tank directly from the signal generated at the resistor network. Such filling level indicators are known in a wide variety of forms in the prior art.

Moreover, filling level indicators are known which, instead of a sliding contact, have a contact element that has a multiplicity of finger-like portions that can be deflected by a magnetic force in such a way that electrical contact is generated between the finger-like portion and a resistor network. A signal is generated as a result of the generation of the electrical contact. Using the generated signal, it is possible to infer the filling level in the fuel tank directly as a function of the configuration of the resistor network and of the contact element. Such a filling level indicator is known, for example, from DE 197 01 246 A1.

A disadvantage of the devices in the prior art is in particular that the sliding contact on the resistor network constitutes a mechanical contact, which is subject to inevitable wear. Furthermore, the sliding contact and the resistor network are in this case arranged entirely in the fuel within the fuel tank, which can result in damaging effects caused by the fuel. The generation of the electrical contact by a contact element with a multiplicity of finger-like portions that can be deflected by a magnet is disadvantageous, because the contact element is highly sensitive to mechanical disturbance influences, which, in particular, makes the installation and transport of the contact elements difficult.

SUMMARY OF THE INVENTION

One aspect of the present invention is creating a filling level indicator that has a mechanically more durable contact element and at the same time permits wear-free generation of a highly accurate signal, which is dependent on the filling level in the fuel tank.

One exemplary embodiment of the invention relates to a filling level indicator for determining a filling level in a tank, having a resistor network, which is arranged on a carrier substrate, a contact element, and a magnetic element, wherein the contact element is arranged adjacent to the resistor network and the magnetic element is movable relative to the resistor network and the contact element, wherein the contact element has a contact region that can be deflected by the magnetic element, wherein an electrically conductive connection between the contact region and the resistor network is produced by deflection of the contact region, wherein the contact element has an attachment region adjacent to the contact region, wherein the attachment region is connected to the carrier substrate, and the contact region is formed spaced apart from the resistor network and the carrier substrate.

The contact element is particularly preferably formed such that both the attachment to the carrier substrate and the spacing of the contact region apart from the resistor network is possible with a single component. In particular, the omission of a spacer element for spacing the contact region apart from the resistor network is advantageous, because an assembly step can be saved, and the complexity of the system is reduced.

It is particularly advantageous if the contact element is formed in one piece. A single-piece design is advantageous because, in this way, no prior assembly is necessary, and simplified assembly of the filling level indicator is possible overall.

It is also advantageous if the contact element is formed from a metallic material. A metallic material is particularly advantageous because, firstly, the electrical conductivity of the contact region is provided already by the material that is used, and furthermore, a metallic material generally exhibits high resistance to the corrosive influences of the fuel. This is advantageous in particular because the need for additional measures for sealing off the housing of the filling level indicator is eliminated, because the internal construction is adequately resistant to the corrosive influences of the fuel, and thus adequate durability can be achieved even without a completely air-tight housing.

A preferred exemplary embodiment is characterized in that the contact region and the attachment region are arranged so as to be offset with respect to one another in a stepped manner. Using a stepped design, it is ensured that the contact region is spaced apart from the resistor network to an adequately great extent in order to prevent the undesired generation of electrical contact between the resistor network and the contact region. It is preferable for both the attachment region and the contact region to be of planar form, such that an attachment to the carrier substrate is possible without stresses being generated in the contact element in the process. Furthermore, by the planar design, it is ensured that the contact region is oriented parallel to the resistor network and is thus, over its entire spatial extent, arranged equidistantly with respect to the resistor network.

It is also preferable if the contact element is generated by the deep-drawing of a plate-like blank. This is advantageous because deep-drawing is well known, and a multiplicity of different materials can be used for producing the contact element. It is also possible in a simple manner to realize a multiplicity of different shape configurations.

It is furthermore advantageous if the contact region is formed as a circular-arc-shaped band portion oriented so as to be parallel and offset with respect to the resistor network. A circular-arc-shaped form is particularly advantageous because the magnet element is preferably guided by a bracket that is rotatable about a fixed center of rotation, whereby a circular-arc-shaped curved path is defined for the movement of the magnet element. The circular-arc-shaped band portion of the contact element is preferably formed so as to correspond to the circular-arc-shaped curved path of the magnet element. It is thereby ensured that the contact region is respectively attracted and deflected uniformly over the entire extent region by the magnetic force of the magnet element, which does not vary aside from aging influences.

It is furthermore advantageous if the contact region is deflectable along a deflection direction toward the resistor network, wherein, in a manner dependent on the position of the magnet element on that side of the resistor network, which is averted from the contact element, in each case only a partial region of the contact region is deflected and moved toward the resistor network. The band-like contact region is in each case only partially deflected, such that always only a limited portion comes into contact with the resistor network. This is necessary to be able to make accurate statements regarding the filling level in the tank. The resistor network is designed such that a specific electrical signal is generated as a function of the position of the magnet element and thus of the position of the generated electrical contact. If, instead, the entire contact region were placed in electrically conductive contact with the resistor network simultaneously, an exact statement regarding the filling level with no longer be possible.

It is also expedient if the contact region is of foil-like form, wherein the material thickness along the main deflection direction is very small in relation to the spatial extent of the contact region in the other spatial directions. The foil-like form is characterized in particular by a very small material thickness along the main deflection direction, that is to say from the contact region toward the resistor network. This has the effect that the contact region can be deflected even as a result of only low magnetic forces. At the same time, the contact region must be designed to be stable enough that no contacting of the resistor network is generated as a result of vibrations and other movements, which can lead to the generation of erroneous signals.

The contact regions may advantageously have structures that generate a segmentation of the contact region. These may for example be recesses, tapered portions or indentations. It can thus be achieved that, in a manner dependent on the position of the magnet element, in each case only a defined segment of the contact region is deflected. In one advantageous embodiment, the individual segments of the contact region may also be movable independently of the respectively adjacent segments, for example by means of cantilevered arm elements arranged adjacent to one another.

It is furthermore advantageous if the contact region is formed by removal of material of the contact element in portions, wherein, as a result of the material removal, a material thickness is produced at the contact region that is reduced in relation to that in the attachment region. The contact region may also be produced by a cutting process, for example by virtue of material removal being performed by milling. Proceeding from a starting material thickness, which is maintained for example in the region of the attachment region, the contact region can be thinned in order to generate adequate flexibility, while at the same time a defined spacing is generated between the resistor network and the contact region.

Advantageous refinements of the present invention are described in the subclaims and in the following description of the FIGURES.

BRIEF DESCRIPTION OF THE DRAWINGS

The invention will be discussed in detail below on the basis of an exemplary embodiment and with reference to the drawing. In the drawing:

The FIGURE is a sectional view through a filling level indicator, wherein the filling level indicator has a housing formed from a carrier substrate and a housing cover, in which housing a resistor network and a contact element are arranged.

DETAILED DESCRIPTION OF THE DRAWINGS

The FIGURE shows a sectional view through a filling level indicator 1, which has a housing which is formed from a housing cover 7 and a carrier substrate 2. Within the housing of the filling level indicator 1, there is arranged a contact element 4 which has a contact region 6 and an attachment region 5. The contact element 4 is formed in one piece, such that the contact region 6 is arranged spaced apart from the resistor network 3. This spacing is achieved in the exemplary embodiment of the FIGURE by virtue of the contact region 6 being offset with respect to the attachment region 4 in a stepped manner.

The contact element 4 is connected to the carrier substrate 2 in the attachment region 5. Below the carrier substrate 2, the magnet element, which is not illustrated in the FIGURE, can be moved in the region of the contact region 6. In this way, a magnetic force can act on the metallic and magnetic contact region 6, whereby said contact region is deflected toward the resistor network 3. The deflection of the contact region 6 takes place along the main deflection direction 8 toward the resistor network 3. As soon as electrically conductive contact is generated between the contact region 6 and the resistor network 3, a specific electrical signal is generated, which is dependent on the position of the magnet element below the carrier substrate 2. By this specific electrical signal, a direct statement regarding the filling level within the tank is possible.

The exemplary embodiment in the FIGURE is in particular not of a limiting nature, and serves for illustrating the concept of the invention. The illustration in the FIGURE is exemplary and does not rule out alternative solutions. In particular, a different design of the carrier substrate 2 or of the housing cover 7 is possible.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A filling level indicator for determining a filling level in a tank, comprising:
    a resistor network arranged on a carrier substrate;
    a one-piece contact element arranged adjacent to the resistor network comprising:
        a contact region at a first longitudinal end of the one-piece contact element;
        an attachment region at a second longitudinal end of the one-piece contact element opposite the contact region, that is connected directly to the carrier substrate; and
        a steplike transition between the contact region and the attachment region so that the contact region and the attachment region are offset with respect to one another in a stepped manner in a rest state;
    a magnetic element configured to be movable relative to the resistor network and the contact element;
    wherein the contact region is configured to be deflected by the magnetic element;
    wherein an electrically conductive connection between the contact region and the resistor network is produced by deflection of the contact region; and
    wherein the contact region is formed spaced apart from the resistor network and the carrier substrate.

2. The filling level indicator as claimed in claim 1, wherein the contact element is formed from a metallic material.

3. The filling level indicator as claimed in claim 1, wherein the contact element is produced by deep-drawing of a plate-like blank.

4. The filling level indicator as claimed in claim 1, wherein the contact region is formed as a circular-arc-shaped band portion, which is oriented to be parallel to and offset with respect to the resistor network.

5. The filling level indicator as claimed in claim 1, wherein the contact region is deflectable along a deflection direction toward the resistor network, wherein, in a manner dependent on a position of the magnet element on that side of the resistor network which is averted from the contact element, in each case only a partial region of the contact region is deflected and deflected toward the resistor network.

6. The filling level indicator as claimed in claim 1,
    wherein the contact region is foil-like,
    wherein a material thickness along a main deflection direction is less in relation to a spatial extent of the contact region in other spatial directions.

7. The filling level indicator as claimed in claim 1,
    wherein the contact region is formed by removal of material of the contact element in portions,
    wherein, as a result of the removal of material, a material thickness is produced at the contact region which is reduced in relation to that in the attachment region.

8. The filling level indicator as claimed in claim 1, wherein the contact region and the attachment region are planar.

* * * * *